Aug. 8, 1933.  A. A. BULL ET AL  1,921,070
WINDSHIELD WIPER
Filed Jan. 26, 1931  2 Sheets-Sheet 1
FIG. 1
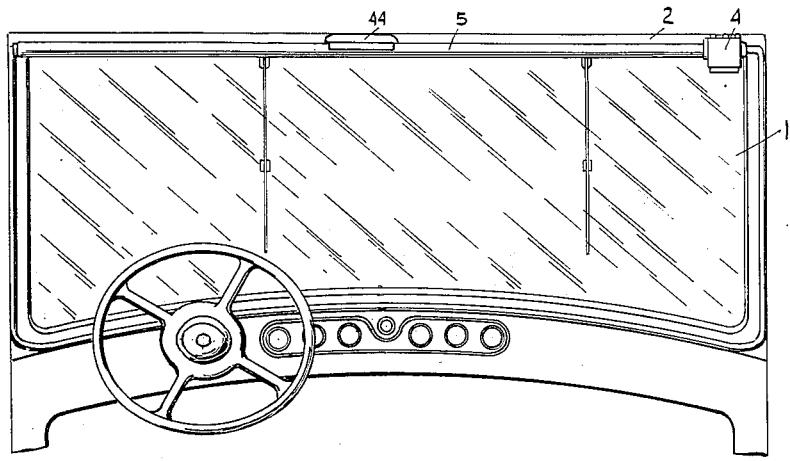
FIG. 2
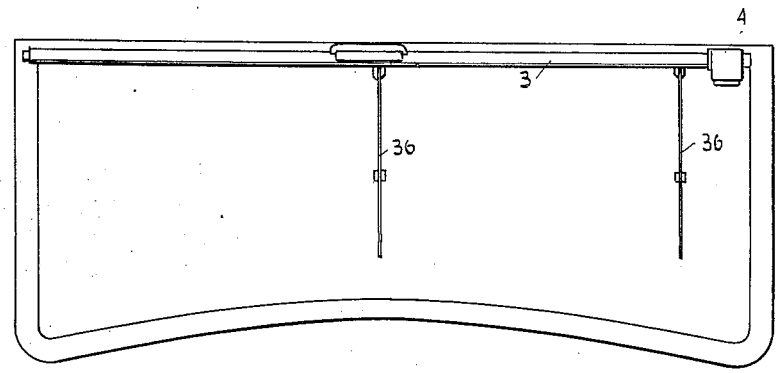
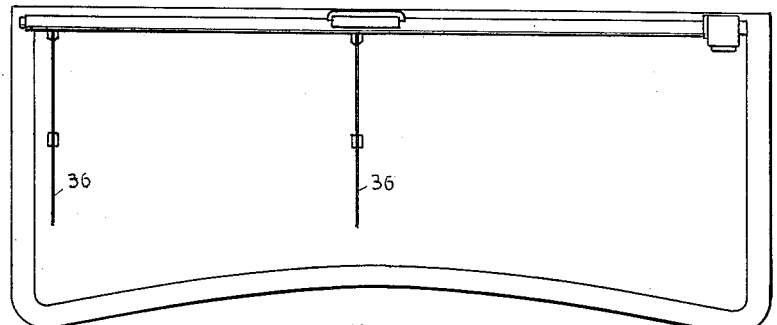
FIG. 3
INVENTOR.
ARTHUR A. BULL
WALTER A. WOOD
BY
ATTORNEYS.

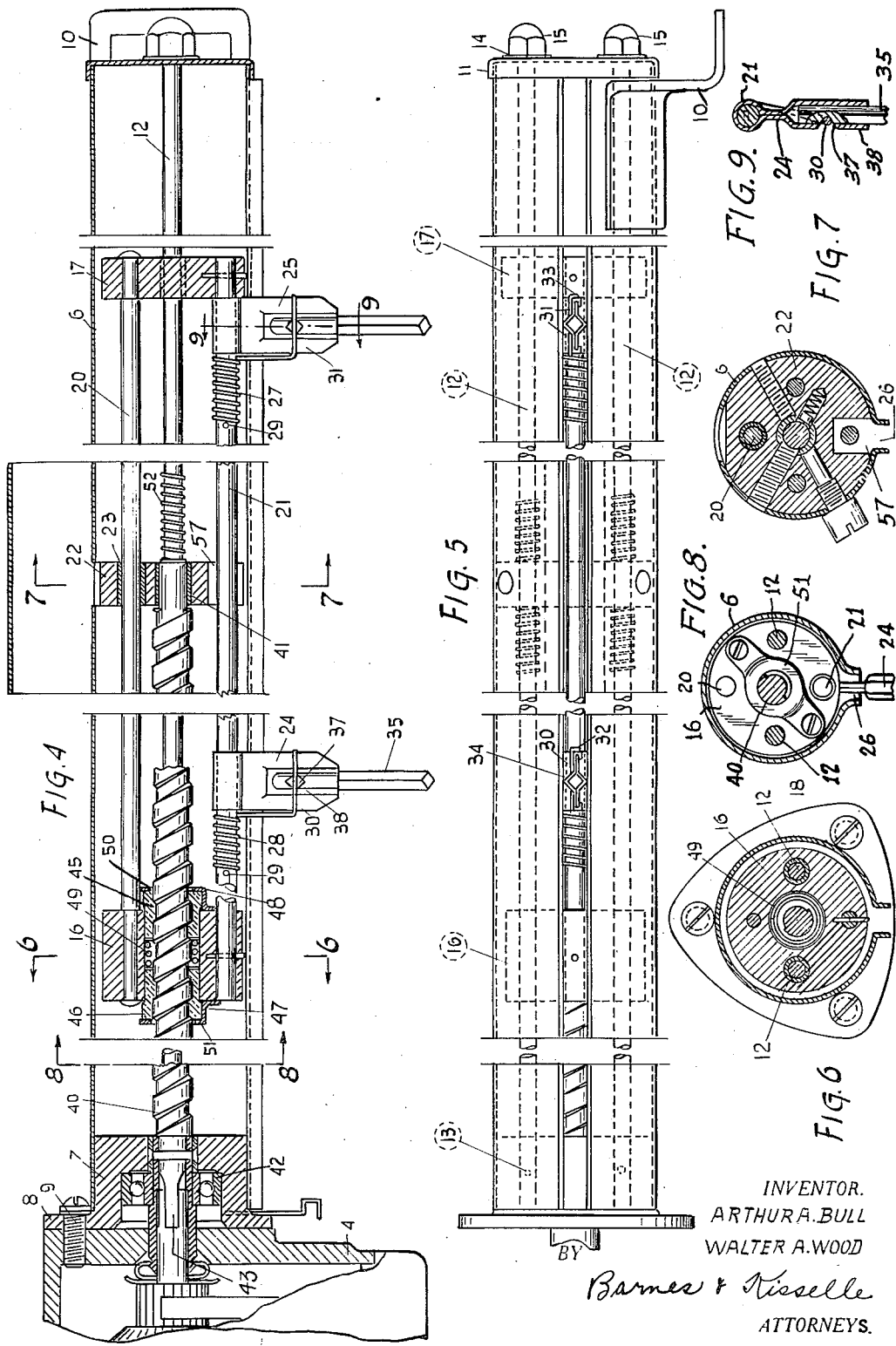

Patented Aug. 8, 1933

1,921,070

UNITED STATES PATENT OFFICE 1,921,070

WINDSHIELD WIPER

Arthur A. Bull and Walter A. Wood, Detroit, Mich., assignors to Handy Governor Corporation, Detroit, Mich., a Corporation of Michigan Application January 26, 1931. Serial No. 511,226

13 Claims. (Cl. 74—14)

This invention relates to a windshield wiper, and more particularly, to a windshield wiper of the electrically operated and reciprocating full-vision type. It is an object of this invention to produce an electrically operated windshield wiper in which the motor is a separate unit from the unitary worm and driven assembly. This permits the motor and the unitary worm and driven assembly to be manufactured separately and operatively connected upon the assembly of the windshield wiper to the vehicle body.

It is an object of this invention to produce a reciprocating windshield wiper in which the operating friction of the unit is very greatly minimized by virtue of the small friction contact area between the reciprocating elements of the windshield wiper and the guide therefor.

It is an object of this invention to produce a reciprocating windshield wiper in which the reciprocating elements are guided by tensioned guides.

It is a further object of this invention to produce a reciprocating windshield wiper having a slipping clutch which permits the absorption of the inertia of the driving and driven units when the current is reversed and slippage between the driving and driven units in case the resistance of the driven unit is greater than the driving torque.

Referring to the drawings:

Fig. 1 is an elevation showing the windshield wiper operatively associated with the windshield of a motor vehicle.

Figs. 2 and 3 show the windshield wiper blades at the extreme opposite ends of their strokes with an overlapping wiping action at the center of the windshield.

Fig. 4 is a longitudinal section of the wiper driving mechanism.

Fig. 5 is a top plan view of the wiper driving mechanism.

Fig. 6 is a section along the line 6—6 of Fig. 4.

Fig. 7 is a section along the line 7—7 of Fig. 4.

Fig. 8 is a section along the line 8—8 of Fig. 4.

Fig. 9 is a section along the line 9—9 of Fig. 4.

Referring more particularly to the drawings, there is shown a fragment or a portion of a vehicle body having a windshield 1 and a header bar 2 upon which is mounted the windshield wiper generally designated 3. The windshield wiper 3 is of the electrically driven worm-operated and reciprocating type. Since it is an object of this invention to simplify and expedite both the initial installation and the repair of the windshield wiper, therefore the assembly comprises two main units, namely, the motor unit 4 and the unitary worm and driven assembly 5. The motor 4 is preferably of the low voltage type of electric motor which comes as a distinct and separate unit from the unit 5. The unit 5 and the motor 4 are operatively connected as they are assembled to the header bar 2.

The driven unit is contained within a tubular sheet metal casing 6 one end of which fits over the bearing member 7 having the annular flange 8 which is secured to the motor by the screws 9. The other end of the tube 6 has fixed thereto the bracket 10 which in turn is secured to the header bar 2. The bracket end of the tube 6 is closed by suitable closure 11.

Since it is an object of this invention to reduce the friction between the sliding members and the guides therefor to a minimum, to this end the tubular member 6 has running lengthwise thereof a pair of guide rods 12. Each of these rods 12 is fixed at one end in the bearing 7, as at 13, and the other end of the rod projects through a suitable opening in the closure 11 and has mounted thereon the washer 14 and the nut 15. It will thus be seen that by turning the nuts 15 the guide rods 12 can be tensioned. The guide rods 12 have slidably mounted thereupon the spaced carrier slide members 16 and 17. The openings in the slide members 16 and 17 through which the guide rods 12 pass are provided with suitable antifriction bushings 18. Since the guide rods 12 can be tensioned to increase their rigidity and since the area of contact between the guide rods 12 and the reciprocating slides 16 and 17 is relatively small, the friction between these reciprocating parts is reduced to a minimum. Among the advantages of the tension rods 12 are these: First, the small surface area of the rod which has a sliding contact with the slides 16 and 17, reduces the friction of the relatively sliding parts very materially; secondly, the fact that these rods 12 can be tensioned gives them a rigidity and straightness that will prevent crimping between the rod and slides 16 and 17, and yet the rods will give sufficiently to take care of commercial tolerances in the slides and guides and associated mechanism to permit smooth and free reciprocation of the driven mechanism.

The slide members 16 and 17 are held in fixed spaced relation by means of the rods 20 and 21 which are fixed at each end to the slides 16 and 17 respectively. The tube 6 has fixed therein and centrally thereof the bearing member 22. The bearing member 22 is provided with suitable holes to permit the passage therethrough of the tensioned rods 12 and the spacer rods 20 and 21, the openings for the spacer rods are provided with suitable anti-friction bushings 23.

The spacer rod 21 has pivotally mounted thereon the wiper blade holders 24 and 25. The pivoted blade holders 24 and 25 project through the slot 26 which extends longitudinally of the bottom of the tube 6. The pivoted blade holders 24 and 25 have associated therewith the coil torsion springs 27 and 28, the springs 27 and 28 each having one end extending transversely through the spacer rod 21, as at 29. The other ends of the coil springs 27 and 28 are bent laterally across the blade holders 24 and 25 as at 30 and 31, respectively. The transverse portions 30 and 31 of the coil springs have their ends bent as at 32 and 33 (Fig. 5). The bent end 32 of the spring 28 prevents the holder 24 from moving to the right along the rod 21.

The members 24 and 25 are identical and each is provided with a suitable square socket 34 which receives the square blade support rod 35, which in turn supports the rubber window wiping blade 36. The rod 35 is provided with a notch 37 which coincides with an opening 38 in the socket portion of the support 24. Hence, when the rod 35 is slid into the socket 34 the transverse arm 30 of the coil spring 28 engages the same in the notch 37 through the opening 38 in the holder 24 to retain the wiper blade removably in position. Hence it will be seen that the arms of the torsion coil springs 27 and 28 at all times apply a yielding torsional pressure against the said holders to yieldably hold the rubber wiper blades 36 against the windshield 1, and serve as a spring latch for securing the window wiper blade rods 35 in the sockets 34.

It will be seen that by properly positioning the blade holders 24 and 25 along the spacer rod 21 that an overlapping action of the window wiping blades 36 can be obtained. This overlapping is brought out in Figs. 2 and 3. The left hand window wiper blade 36 is shown in its extreme right hand position in Fig. 2, and in Fig. 3 the right hand window wiper blade 36 is shown in its extreme left hand position. Thus, along the vertical center line of the windshield 1 the wiping action of the wiper blades overlaps and thus insures a continuous rather than intermittent wiped area on the windshield. This overlapping of the wiper blades 36 is effected by adjusting the blade holders 24 and 25 along the rod 21. It will be seen that the holder 25 is positioned adjacent the slide 17 so that as the slide 17 reciprocates to the left the holder 25 will not quite enter the slot 57 in the central bearing 22, whereas the holder 24 is spaced outwardly from the slide 16 a sufficient distance to permit the holder 24 to pass through and beyond the recess 57 in the bearing 22 when the slide 16 reaches the extreme right hand end of its stroke to insure an overlapping wiping action.

The slides 16 and 17 and associated window wiping parts are arranged to be reciprocated by a single worm 40. The worm 40 has one end journaled in the bearing support 22 as at 41, and the other end is suitably supported within the bearing 7 by means of the ball race 42, the end of the shaft 40 is likewise provided with suitable splines 43 for engaging complemental splines on the shaft of the motor 4.

Since but a single worm 40 is used for reciprocating the slides 16 and 17 and associated mechanism, the worm 40 must be alternately rotated in one direction and then in the reverse direction. To this end the tube 6 has mounted thereupon a suitable switch generally designated 44 which is alternately operated by the slides 16 and 17 to reverse the flow of the current and consequently reverse the rotation of the motor and associated worm 40 to reciprocate the wiping mechanism. The specific type of switch used is shown in our copending application filed January 26, 1931, Serial No. 511,227, which is now Patent No. 1,890,842.

The rotary movement of the worm 40 is transmitted to the wiping slide 16 and associated wiping mechanism by a slipping clutch. More specifically, this slipping clutch comprises a pair of opposed clutch facings 45 and 46 which are journaled in the slide member 16. The clutch facing members 45 and 46 are retained in their journals by the small brackets 47 and 48 which are fixed respectively to the opposite faces of the slide member 16. The clutch facing members 45 and 46 are internally threaded to interfit with the threads of the worm 40 and are yieldably held apart by the coil spring 49. The tension of the coil spring 49 effects a yielding frictional clutching engagement between the outer faces of the members 45 and 46 and the brackets 47 and 48, as at 50 and 51. In other words, the coil spring 49 in conjunction with the clutch facing members 45 and 46 cooperate with the brackets 47 and 48 to form a slipping clutch. This slipping clutch serves to absorb the inertia of the driving and driven parts whenever the current is reversed to reverse the motor and whenever the resistance of the slides 16 and associated wiping mechanism becomes greater than the friction between the clutch facing members 45 and 46 and brackets 47 and 48.

The guide rods 12 have threaded thereupon between slides 16 and 17 and the central bearing member 22 the coil springs 52.

Thus, in operation, assuming the worm 40 is turning to effect movement of the slides 16 and 17 and associated wiping mechanism to the right: the worm through its threaded engagement with the threaded openings in the clutch members 45 and 46, through their frictional engagement with the brackets 47 and 48, effects a movement to the right of the wiping mechanism, provided the frictional clutching engagement between the members 45 and 46 and the brackets 47 and 48 is greater than the resistance offered by the slides 16 and 17 and associated wiping mechanism. In this case the members 45 and 46 do not rotate with the worm 40 but remain stationary in their journals in the slide 16. As the slides 16 and 17 and associated mechanism approach the end of their stroke to the right, the two springs 52 to the left of the central stationary bar 22 are compressed by the movement to the right of the slide 16. Hence, at this time the slip clutch, owing to the increased resistance of the coil springs 52 which are being compressed, begins to slip to absorb the torque of the motor and the driving worm just prior to the termination of the rightward stroke of the slides 16, 17 and associated mechanism. The reversing switch is then thrown and the motor reversed. At this time the inertia of the driven mechanism causes the clutch to temporarily slip while the sliding driven mechanism is getting under way in its leftward movement. In overcoming the inertia of the driven member the slip clutch is assisted by the expansion of the coil springs 52.

A further advantage of this slip clutch is that in case the wiper blades meet an obstruction on the windshield, such as ice, or are obstructed in some other way while the wiper is in operation, the clutch will slip and thereby prevent injury to the wiper blades and to the driving and driven parts.

What we claim is:

1. A windshield wiper comprising in combination an electric motor and associated driving worm, reciprocating driven mechanism, mechanism for reversing the current and the rotation of the motor and associated worm, and a slip connection between the driving worm and the driven mechanism whereby the inertia of the driving and driven mechanism is absorbed when the current is reversed.

2. A windshield wiper comprising in combination an electric motor, a switch for reversing the flow of current to the motor, a worm operatively connected with the motor, a reciprocating slide, a slipping clutch for transmitting the driving torque of the worm to the slide to reciprocate the same and to absorb the inertia of the moving members when the switch is actuated to reverse the flow of the current.

3. A windshield wiper comprising in combination reversible driving mechanism including a worm, a reciprocating driven mechanism, and a slip clutch arranged to reciprocate with the driven mechanism for transmitting the torque of the worm to the reciprocating driven mechanism including a yieldable member having a frictional engagement with the reciprocating driven mechanism and a threaded engagement with the worm to permit slippage between the yieldable member and driven mechanism to absorb the inertia of the same when the driving mechanism is reversed.

4. A windshield wiper comprising in combination a reversible driving mechanism including a worm, a reciprocating slide, a plurality of members threaded upon the said worm and having a yielding frictional contact with the reciprocating slide whereby the said members rotate with the said worm and slidably engage the said reciprocating member to absorb the inertia of the driving and driven members when the driving mechanism is reversed.

5. A windshield wiper comprising in combination reversible driving mechanism including a worm, a reciprocating slide, a guide for the said slide, a pair of internally threaded sleeves threaded on the said worm and journaled in the said slide, a pair of members fixed to the said slide, spring means for effecting a yielding frictional engagement between the said threaded sleeves and said pair of members whereby the inertia of the driving and driven parts is absorbed when the driving mechanism is reversed.

6. In a windshield wiper, a reversible driving mechanism including a worm, reciprocating driven mechanism, a slip clutch between the driving and driven members, guide means for guiding the reciprocating driven mechanism, and resilient means positioned at either end of the said guide means arranged to be compressed during the termination of the one stroke to absorb the inertia of the reciprocating mechanism and to expand at the initiation of the return stroke of the reciprocating mechanism to assist the slip clutch to transmit the driving torque to the driven member.

7. In a windshield wiper, a driving mechanism including a worm, a driven mechanism including a slide, a guide rod for the said slide, a slip clutch carried by the slide member, and a spring positioned between the slide and the end of the guide rod arranged to be compressed at the termination of the stroke of the said driven mechanism, and to expand to assist the slip clutch to transmit the driving torque to the driven member during the initial reverse movement of the said driving mechanism.

8. A windshield wiper comprising in combination a reversible driving mechanism including a worm, a reciprocating driven mechanism, a slip clutch positioned between the driving worm and the driven mechanism and adapted to reciprocate with the driven mechanism, the slip clutch serving to absorb the inertia of the driving and driven mechanism when the driving mechanism is reversed.

9. A windshield wiper comprising in combination a reversible driving mechanism including a worm, a reciprocating driven mechanism, a slip clutch comprising a pair of members each having a clutch face, yieldable means for holding the clutch faces in engagement, one of the said members being fixed to the said driven mechanism and the other of said members being threaded onto the said screw whereby said clutch reciprocates with the driven mechanism and absorbs the inertia of the driving and driven mechanism when the same is reversed.

10. In a windshield wiper the combination of a driving mechanism including a worm, a reciprocating driven mechanism and a slip clutch arranged to reciprocate with the driven mechanism for transmitting the driving torque from the driving worm to the driven mechanism.

11. In a windshield wiper the combination of a driving mechanism including a worm, a reciprocating driven mechanism and a slip clutch arranged to reciprocate with the driven mechanism, the said clutch including a part fixed to the driven member and another part threaded on the worm.

12. In a windshield wiper the combination with a driving mechanism including a worm, of a reciprocating driven mechanism and a slip clutch arranged to reciprocate with the driven mechanism, the said slip clutch comprising a pair of members each having a clutch face, one of the said members being fixed to the driven mechanism and the other of said members being journaled in the driven member and threaded upon the worm, and resilient means acting upon the said members for maintaining the clutch faces in clutching engagement.

13. A windshield wiper comprising a casing, a slide having a plurality of openings reciprocable within said casing, a pair of tensionable guide rods extending lengthwise of and within the said casing and through the openings in the said slide, the said slide being slidably supported solely by the said rods throughout a portion of its travel and out of contact with the said casing, and means for driving the said slide back and forth within the said casing upon the said tensionable guide rods.

ARTHUR A. BULL.
WALTER A. WOOD.